US007887903B2

(12) United States Patent
Uehara et al.

(10) Patent No.: US 7,887,903 B2
(45) Date of Patent: Feb. 15, 2011

(54) ANTIFOG LAMINATED FILM

(75) Inventors: Tsutomu Uehara, Omitama (JP); Takeo Omori, Omitama (JP); Tadayoshi Itoh, Omitama (JP)

(73) Assignee: Kureha Corporation, Tokyo (JP)

( * ) Notice: Subject to any disclaimer, the term of this patent is extended or adjusted under 35 U.S.C. 154(b) by 0 days.

(21) Appl. No.: 11/587,086

(22) PCT Filed: Apr. 19, 2005

(86) PCT No.: PCT/JP2005/007753

§ 371 (c)(1),
(2), (4) Date: Oct. 19, 2006

(87) PCT Pub. No.: WO2005/102693

PCT Pub. Date: Nov. 3, 2005

(65) Prior Publication Data

US 2007/0212549 A1 Sep. 13, 2007

(30) Foreign Application Priority Data

Apr. 20, 2004 (JP) ............................. 2004-124632

(51) Int. Cl.
B32B 23/18 (2006.01)
B32B 27/18 (2006.01)
B32B 27/32 (2006.01)
B32B 27/36 (2006.01)
B32B 27/40 (2006.01)

(52) U.S. Cl. ................. 428/195.1; 428/34.9; 428/35.4; 428/36.6; 428/206; 428/207; 428/340; 428/423.1; 428/423.7; 428/480; 428/481; 428/483; 525/452; 525/453; 106/168.1

(58) Field of Classification Search ........................ None
See application file for complete search history.

(56) References Cited

U.S. PATENT DOCUMENTS

| 5,037,475 | A | * | 8/1991 | Chida et al. ................. 106/403 |
| 5,375,701 | A | * | 12/1994 | Hustad et al. ................. 206/542 |
| 5,430,093 | A | * | 7/1995 | Miyamoto et al. ........... 524/504 |
| 5,674,941 | A | * | 10/1997 | Cho et al. .................... 525/102 |
| 5,851,610 | A | * | 12/1998 | Ristey et al. ................ 428/34.9 |
| 5,914,164 | A | * | 6/1999 | Ciocca et al. ............... 428/36.7 |
| 5,962,092 | A | * | 10/1999 | Kuo et al. ................... 428/34.9 |
| 6,051,305 | A | * | 4/2000 | Hsu .......................... 428/195.1 |
| 6,099,967 | A | * | 8/2000 | Takahashi et al. ......... 428/32.85 |
| 6,221,470 | B1 | * | 4/2001 | Ciocca et al. ............... 428/218 |
| 6,231,953 | B1 | * | 5/2001 | Mossbrook et al. ....... 428/195.1 |
| 6,406,763 | B1 | * | 6/2002 | Wolf et al. .................. 428/34.9 |
| 6,602,590 | B2 | * | 8/2003 | Ting et al. ................... 428/218 |
| 6,623,821 | B1 | * | 9/2003 | Kendig ....................... 428/34.9 |
| 6,677,014 | B1 | * | 1/2004 | Edlein et al. ................ 428/35.7 |
| 6,706,389 | B1 | * | 3/2004 | Bates et al. .................. 428/349 |
| 6,723,820 | B1 | * | 4/2004 | Arcurio et al. ................ 528/61 |
| 6,726,968 | B2 | * | 4/2004 | Porter ........................ 428/35.2 |
| 6,802,113 | B2 | * | 10/2004 | Staker .......................... 29/595 |
| 6,838,186 | B2 | * | 1/2005 | Aral et al. ................... 428/516 |
| 6,893,489 | B2 | * | 5/2005 | Lem et al. ................. 106/31.64 |
| 7,063,882 | B2 | * | 6/2006 | Mossbrook et al. ......... 428/203 |
| 2003/0170409 | A1 | * | 9/2003 | Porter et al. ................ 428/34.9 |
| 2003/0198764 | A1 | * | 10/2003 | Kendig ........................ 428/34.9 |
| 2005/0208275 | A1 | * | 9/2005 | Abe et al. ................. 428/195.1 |
| 2006/0046005 | A1 | * | 3/2006 | McGee ...................... 428/34.4 |

FOREIGN PATENT DOCUMENTS

| EP | 0 874 872 B1 | * | 4/2001 |
| JP | 06-171035 | | 6/1994 |
| JP | 07-304139 | | 11/1995 |
| JP | 09-066587 | | 3/1997 |
| JP | 09-302289 | * | 11/1997 |
| JP | 2000-063471 | * | 2/2000 |
| JP | 2002-240214 | | 8/2002 |

OTHER PUBLICATIONS

International Search Report.

* cited by examiner

*Primary Examiner*—Vivian Chen
(74) *Attorney, Agent, or Firm*—Reed Smith LLP

(57) ABSTRACT

The present invention provides a laminated film including at least two layers of an outer layer having a printed portion on a surface and an inner layer subjected to an antifogging treatment in which principal resin comprising a solid content of the printed portion is made of chlorinated polypropylene-based resin or urethane-based resin. This antifog laminated film hardly degrades in an antifogging property even when the antifog laminated film subjected to printing on the outer layer of a surface subjected to the antifogging treatment and the printed surface are strongly brought into contact with each other due to an operation of winding the film into a roll or the like.

17 Claims, No Drawings

ANTIFOG LAMINATED FILM

TECHNICAL FIELD

The present invention relates to an antifog laminated film which includes at least two layers of an outer layer having a printed portion on a surface and an inner layer subjected to an antifogging treatment. More specifically, the present invention relates to an antifog laminated film in which principal resin comprising a solid content of the printed portion is made of chlorinated polypropylene-based resin or urethane-based resin.

BACKGROUND OF THE INVENTION

When a food product containing water is packed in a tray and displayed at a store front or the like at low temperature with a surface of the tray wrapped with a plastic film, fog grows on the plastic film on the side facing the food product particularly in a case where the food product is a high water-containing product. This is a result of fog generation on the inner surface of the wrapping film facing the food product due to aggregation of tiny water vapors. Invisibility of the contents of the wrapped products through the wrapping film falls into disfavor with consumers. Various attempts have been proposed in order to prevent fog generation on a plastic film on the side facing a food product.

Japanese Unexamined Patent Application Publication No. 2002-240214 proposes a sealant film having an excellent antifogging property in which a ketonic compound layer of an ethylene-vinyl acetate copolymer and/or a polyamide-based resin layer are laminated in accordance with a co-extrusion method on one surface of a polyolefin-based resin layer containing an antifog agent with a modified polyolefin-based resin layer interposed in between.

However, when the film using the antifog agent is an antifogging film having a printed surface on an outer layer, the antifogging effect may be lost if the printed film is rolled and stored. When the film is rolled on a spindle of a core material after printing on the film, the printed surface and a surface on an inner layer of the film subjected to an antifogging treatment are brought into contact with each other at a high pressure. Moreover, storage of the film in the state of being wound into the roll causes degradation in the antifogging property of the film attributable to the strong contact between the printed surface on the outer layer and the surface of the inner layer subjected to the antifogging treatment. This degradation in the antifogging property is considered as being due to partial transition of the antifog agent to the outer layer or into components of printing ink.

U.S. Pat. No. 6,677,014 proposes a plastic antifogging film having a first side and a second side in which at least the first side of the antifogging film has an antifogging property and at least part of the second side has a printed image, the printed image being formed of an effective amount of cellulose acetyl propionate including an average propionyl content ranges from about 35 wt % to 55 wt %, an average acetyl content ranges from about 0.3 wt % to 3 wt %, and an average hydroxyl content ranges from about 1 wt % to 10 wt % on the basis of the cellulose acetyl propionate; i.e., the use of printing ink containing specific components. Although these techniques exert an antifogging effect to some extent, there is a demand for development of a technique that can maintain an antifogging property more effectively.

An object of the present invention is to provide an antifog laminated film in which occurrence of degradation in an antifogging property can be reduced even when there is a strong contact between a surface subjected to an antifogging treatment and a printed surface of the antifog laminated film having a printed outer layer due to an operation of winding the film into a roll and the like.

DISCLOSURE OF THE INVENTION

The present invention has been accomplished based on a finding that degradation in an antifogging property hardly occurs in a laminated film including an outer layer having a printed portion on a surface and an inner layer subjected to an antifogging treatment even after winding the film into a roll by use of chlorinated polypropylene-based resin or urethane-based resin as principal resin comprising a solid content of the printed portion.

Specifically, a first aspect of the present invention provides an antifog laminated film including at least two layers of an outer layer having a printed portion on a surface and an inner layer subjected to an antifogging treatment, in which principal resin comprising a solid content of the printed portion of the laminated film includes any of chlorinated polypropylene-based resin or urethane-based resin. A second aspect of the present invention provides the antifog laminated film of the foregoing aspect, in which the chlorinated polypropylene-based resin is set not less than 50 wt % of a resin component of the solid content of the printed portion. A third aspect of the present invention provides the antifog laminated film of the first aspect, in which the urethane-based resin is set not less than 50 wt % of a resin component of the solid content of the printed portion.

A fourth aspect of the present invention provides the antifog laminated film of any one of the first to the third aspects, in which the antifogging treatment is performed by adding an antifog agent to resin comprising the inner layer and/or by coating the antifog agent onto the inner layer.

A fifth aspect of the present invention provides the antifog laminated film of the fourth aspect, in which the antifog agent is coated onto the printed surface of the outer layer. A sixth aspect of the present invention provides the antifog laminated film of anyone of the first to fifth aspects, in which the printed portion of the outer layer contains the antifog agent. A seventh aspect of the present invention provides the antifog laminated film of any one of the first to sixth aspects, in which the printed portion is overprinted by use of resin obtained by mixing the foregoing resin with another resin essentially containing nitrocellulose. An eighth aspect of the present invention provides the antifog laminated film of the seventh aspect, in which the antifogging treatment is performed by adding the antifog agent to the overprinted portion or coating the antifog agent onto the overprinted surface. A ninth aspect of the present invention provides the antifog laminated film of anyone of the first to eighth aspects, in which the antifog agent is any of a surfactant and a mixture of surfactants selected from an anionic surfactant, a cationic surfactant, a nonionic surfactant, and an amphoteric surfactant. A tenth aspect of the present invention provides the antifog laminated film of any one of the first to ninth aspects, in which the outer layer is made of polyester-based resin and the inner layer is made of polyolefin-based resin. An eleventh aspect of the present invention provides the antifog laminated film of the tenth aspect, which further includes an oxygen gas barrier layer. A twelfth aspect of the present invention provides the antifog laminated film of any one of the first to eleventh aspects, in which the inner layer is a heat sealing layer. A thirteenth aspect of the present invention provides the antifog laminated film of any one of the first to twelfth aspects, in which the antifog laminated film has a heat-shrinkable property.

DETAILED DESCRIPTION OF THE PREFERRED EMBODIMENT

An embodiment of the present invention will be described below.

An antifog laminated film of the present invention is a film including at least two layers of an outer layer having a printed portion on a surface and an inner layer subjected to an antifogging treatment. Other layers can be provided as appropriate. In the present invention, the printed portion is made of either a single layer or multiple layers, and includes a layer printed by use of printing ink containing pigment. A "solid content of the printed portion" means a solid content which is printed and then dried by evaporation of a volatile material in a vehicle of the printing ink (an inorganic material may be also included therein when contained in the printing ink). Meanwhile, "principal resin comprising the solid content of the printed portion" means resin having the largest weight ratio among resin components in the solid content of the printed portion. In the case of a mixture of resins, the "principal resin" means a resin having the largest weight ratio. When there are two types of resin each having the largest weight ratio, the resin will be included in the principal resin in the present invention as long as one of the types of resin is chlorinated polypropylene or urethane-based resin according to the present invention. Moreover, this laminated film may be either heat shrinkable or non-heat shrinkable. Coating resin onto a printed surface in order to protect the printed surface and to obtain scratch resistance, heat resistance, and gloss is referred to as overprinting. A coated layer may be referred to as an overprint, an overprinted portion, an overprinted surface, an overcoat, a lacquer coat, or a top coat from time to time as appropriate.

No particular limitations are imposed on resin comprising the outer layer, and thermoplastic resin such as polyolefin-based resin, polypropylene-based resin, polyester-based resin or aliphatic nylon is used. However, the polyester-based resin is preferable from the viewpoint of intrinsically having high heat resistance and printability as compared to the polyolefin-based resin as a typical sealing layer, and of having fine moisture resistance stability as compared to polyamide resin. Moreover, in the case of using polyamide resin as an intermediate layer as appropriate, it is formed as a heat-shrinkable multilayer film having relatively favorable dimensional stability and excellent qualifications for a heat-shrinkable wrapping material without performing a heat treatment which causes reduction in heat-shrinkable property after a biaxial orientation process. That is because co-orientation characteristics are harmonized between the polyester-based resin in the outer layer and the polyamide resin in the intermediate layer. Although any of aliphatic polyester-based resin and aromatic polyester-based resin is used as the polyester-based resin, it is preferable to use aromatic polyester-based resin containing an aromatic dicarboxylic acid component. It is particularly preferable to use polyester combining terephthalic acid as the dicarboxylic acid component and a diol having a carbon number equal to or below 6, such as polyethylene terephthalate. In the case of copolyester based resin obtained by substituting terephthalic acid partially preferably in an amount up to 12 mol % with different dicarboxylic acid such as isophthalic acid, one having inherent viscosity from about 0.6 to 0.8 is preferably used. The outer layer may contain thermoplastic resin other than the polyester-based resin in an amount up to 20 wt %, such as a thermoplastic elastomer as typified by thermoplastic polyurethane, or polyolefin-based resin which is modified with an acid such as maleic acid or an anhydride thereof. After formation of the laminated film, the surface of the outer layer is subjected to printing as described later.

An antifogging treatment means a treatment to impart an antifogging property by adding an antifog agent to a resin composition targeted for imparting the antifogging property or by coating the antifog agent onto a layer made of that resin composition, or alternatively, by performing both of these operations. To reduce degradation in an antifogging effect attributable to a contact between a surface of the inner layer subjected to the antifogging treatment and the printed surface of the outer layer, the antifog agent may also be coated onto the printed surface of the outer layer preferably in a range from $0.01$ $g/m^2$ to $1.0$ $g/m^2$ or more preferably in a range from $0.05$ $g/m^2$ to $0.5$ $g/m^2$. To further enhance the antifogging effect, the printed portion may contain the antifog agent. Specifically, it is possible to add the antifog agent to printing ink before printing. It is possible to add the antifog agent in an amount preferably from 0.1 wt % to 10 wt % or more preferably from 0.2 wt % to 5 wt % relative to a total solid content in the printing ink. The printing ink used for printing on the surface of the outer layer varies depending on the types of pigment and resin contained therein, other additives, printed images (designs), the print area (the scanning area), the number of colors used, and the like. However, it is possible to identify the color and characters clearly at a coating amount typically in a range from $0.1$ $g/m^2$ to $8$ $g/m^2$ or specifically in a range from about $0.2$ $g/m^2$ to $4$ $g/m^2$.

Meanwhile, resin to be overprinted in another aspect is preferably resin obtained by mixing the resin with another resin principally containing nitrocellulose, or more preferably one containing the nitrocellulose in a range from 50 wt % to 90 wt % or particularly preferably one containing the nitrocellulose in a range from 60 wt % to 80 wt % from the viewpoint of heat resistance of an overprinted portion. Urethane-based resin is preferably used as the resin to be mixed with the nitrocellulose. Although the urethane-based resin has the heat resistance, gloss, and scratch resistance factors that are inferior to those of the nitrocellulose, it is not favorable to use only the nitrocellulose for the overprinted portion from the viewpoint of the antifogging property. It is preferable to coat (overprint) the mixed resin containing the nitrocellulose and the urethane-based resin preferably in a range from 90/10 to 50/50 (the weight ratio) on the printed surface in a range from $0.05$ $g/m^2$ to $3$ $g/m^2$ (in the solid content equivalent) or more preferably in a range from $0.1$ $g/m^2$ to $1$ $g/m^2$ (in the solid content equivalent). Moreover, at the time of overprinting, it is also possible to add the antifog agent to the overprinted portion or to coat the antifog agent on an overprinted surface. The amount of addition of the antifog agent is set preferably in a range 0.5 wt % to 15 wt %, more preferably in a range from 1 wt % to 10 wt %, or most preferably in a range from 1 wt % to 7.5 wt % relative to an over print solid content. The amount of coating the antifog agent on the overprinted surface is set preferably in a range from $0.01$ $g/m^2$ to $1.0$ $g/m^2$ or more preferably in a range from $0.05$ $g/m^2$ to $0.5$ $g/m^2$. In the case of overprinting, the resin is dissolved in any of an alcohol solvent such as ethanol or n-propyl alcohol, propyl acetate, water, or a mixed solvent thereof and is coated in the form of a coating solution (overprint varnish).

Resin comprising the inner layer does not have particular limitations, and thermoplastic resin such as polyolefin-based resin, polypropylene-based resin, polyester-based resin, aliphatic nylon or the like is applicable. However, it is preferable that the resin have a heat sealing characteristic, and polyolefin-based resin polymerized by use of single-site catalyst or metallocene catalyst (which may be hereinafter abbreviated as SSC) is preferred. For example, one selected from thermoplastic resin including linear low-density polyethylene (SSC-LLDPE), liner very low-density polyethylene (SSC-VLDPE), conventional ethylene-α-olefin copolymers which are generally referred to as LLDPE, VLDPE, and the like, ethylene-vinyl acetate copolymers (EVA), ethylene-methacrylic acid copolymers (EMAA), ethylene-methacrylic acid unsaturated aliphatic carboxylic acid copolymers, low-density polyethylene (LDPE), ionomers (IO), ethylene-acrylic acid copolymers (EAA), ethylene-methyl acrylate copolymers (EMA), ethylene-ethyl acrylate copolymers (EEA), ethylene-butyl acrylate copolymers (EBA), and the like can be favorably used. The sealing resin preferably has the melting point equal to or below 150° C., or equal to or below 135° C. in particular. It is also possible to use a blended material at least containing one of these substances within a range not inhibiting transparency of the film.

In the present invention, it is essential that the inner layer be subjected to the antifogging treatment. The inner layer subjected to the antifogging treatment means that it is possible to form the film by adding the antifog agent to the resin comprising the inner layer at the time of film formation or to coat the antifog agent onto a surface of the formed inner layer, or alternatively to perform both of these operations.

Publicly-known materials can be used as the antifog agent without particular limitations. Substances categorized in the antifog agent include surfactants such as anionic surfactants, cationic surfactants, nonionic surfactants or amphoteric surfactants. To be more precise, there are aliphatic alcohol esters, polyether, polyhydroxy alcohol, polyhydroxy aliphatic alcohol esters, polyethoxy aromatic alcohol, nonionic ethoxylate, hydrophilic fatty acid esters, and the like. In particular, the antifog agents including the nonionic surfactants such as polyoxyethylene, sorbitan monostearate, polyoxyethylene sorbitan monolaurate, polyoxyethylene monopalminate, polyoxyethylene sorbitan tristearate, polyoxyethylene sorbitan trioleate, poly(oxypropylene), aliphatic alcohol polyethoxylate, polyoxylene 4-nonylphenol, polyhydroxy alcohol, propylene diol, propylene triol, ethylene glycol, sucrose fatty acid esters, monoglyceride esters of vegetable oil or animal fat and oil, monoglyceride or diglyceride such as glycerol monodiolate or glycerol diolate, glyceryl stearate, glycerin monocaprylate, diglycerin monostearate, diglycerin monomyristate, diglycerin monolaurate, diglycerin monooleate, decaglycerin laurate, monophenyl polyethoxylate, sorbitan monolaurate or a mixture thereof. Furthermore, anionic surfactants such as polyoxyethylene alkyl ether carboxylate, alkylbenzene sulfonate, higher alcohol sulfate, polyoxyethylene alkyl ether phosphate or the like, cationic surfactants such as aliphatic amine salts, aliphatic quaternary ammonium salts, benzethonium chloride, pyridinium salts or the like, amphoteric surfactants such as aminocarboxylates, lecithin, alkylamine oxide or the like, and the like can be used either singly or in the form of a mixture.

As practical aspects of these antifog agents, polyethylene resin, (poly)glycerin fatty acid esters, polyoxyethylene alkyl ether, or an antifog agent of a master batch type made of a mixture thereof, such as RIKEMASTER KP-410 (made by Riken Vitamin Co., Ltd.) or RIKEMASTER LAR-360 (made by Riken Vitamin Co., Ltd.) is available. The content of the antifog agent of a resin composition comprising the inner layer is set preferably in a range from 0.2 wt % to 5 wt %, more preferably in a range from 0.3 wt % to 4 wt %, or particularly preferably in a range from 0.3 wt % to 3.5 wt %. Alternatively, it is possible to coat the antifog agent onto the formed inner layer or to coat the antifog agent further on the surface of the inner layer which is formed by adding the antifog agent to the resin composition in advance. When coating the antifog agent, it is preferable to target a coating amount in a range from about 0.01 g/m$^2$ to 1.0 g/m$^2$, more specifically in a range from about 0.05 g/m$^2$ to 0.5 g/m$^2$ or particularly in a range from about 0.1 g/m$^2$ to 0.5 g/m$^2$.

As the layer configuration comprising the present invention, it is possible to provide an intermediate layer in addition to the outer layer and the inner layer. The intermediate layer may include a single layer or may have multiple layers. One of the intermediate layers is a polyamide-based resin layer. As the polyamide-based resin (PA), it is possible to cite aliphatic polyamide polymers such as nylon 6, nylon 11, nylon 12, nylon 69, nylon 610, nylon 612 or the like, and aliphatic polyamide copolymers such as nylon 6/66, nylon 6/610, nylon 6/12 or the like, for example. Among them, nylon 6/66 and nylon 6/12 are particularly preferred from the viewpoint of processability. It is possible to use these aliphatic polyamide copolymers either singly or by blending two or more kinds.

In addition, blended materials of these aliphatic polyamide copolymers, as main ingredients, and aromatic polyamide are also used. For example, it is possible to cite blended materials of aliphatic polyamide such as nylon 66/610/MXD6 (i.e., polymethaxylylene adipamide), and aromatic polyamide containing an aromatic diamine unit, and blended materials of aliphatic polyamide such as nylon 66/69/6I, nylon 6/6I or nylon 6I/6T and aromatic polyamide copolymers containing an aromatic carboxylate unit. Among these polyamide-based resin materials one having the melting point in a range from 160° C. to 210° C. either by a single use or in the form of a mixture is favorably used. The intermediate layer may also contain thermoplastic resin other than the polyamide-based resin in an amount up to about 30 wt %, including, olefin-based resin modified with acids such as maleic acid or anhydrides thereof, ethylene-acrylate copolymers, ethylene-methacrylate copolymers, ionomers, saponified ethylene-vinyl acetate copolymers, or the like.

One of the intermediate layers may be an oxygen gas barrier layer. As resin comprising the oxygen gas barrier layer, for example, it is possible to cite publicly-known saponified ethylene-vinyl acetate copolymers (EVOH), the aforementioned aromatic polyamide containing aromatic diamine such as polymethaxylyene adipamide, amorphous aromatic polyamide containing aromatic carboxylate such as polyhexamethylene isophthalamide/terephthalamide (hereinafter abbreviated as nylon 6I/6T) which is a copolymer of isophthalic acid, terephthalic acid, and hexamethylene diamine, and the like.

Another favorable resin for comprising the intermediate layer is a copolymer formed at least one kind of monomer that contains an oxygen atom in its molecule, and ethylene. To be more precise, it is possible to cite EVA, EMAA, ethylene/methacrylic acid/unsaturated aliphatic carboxylic acid copolymers, EMA, EAA, EBA, IO, and the like.

An adhesive resin layer can be provided as the intermediate layer as appropriate in a case where adhesion between the respective layers is insufficient, for example. It is possible to select and use the above-described resin for comprising the intermediate layer. More preferably, EVA, EEA, EAA, acid-modified polyolefin (including a reaction product of a single substance or a copolymer of olefin group, and unsaturated carboxylic acid such as maleic acid or fumaric acid, acid anhydride, ester, or metal salt; such as acid-modified VLDPE, acid-modified LLDPE or acid-modified EVA) can be used. As a favorable material, it is possible to cite olefin-based resin modified by use of acids such as maleic acid or anhydrides thereof, for example.

Note that in the above-described layer configuration, it is also possible to add publicly-known additives such as anti-blocking agents, lubricants, antioxidant agents, ultraviolet absorbents, stabilizers or the like, in a range not degrading the effect of antifogging.

An example of a manufacturing method of the antifog laminated film of the present invention will now be described. An outer layer made of polyester-based resin (an amount of isophthalic acid in acid components in ethylene terephthalate copolyester: 12 mol %, an amount of terephthalic acid therein: 88 mol %)/an adhesive resin layer made of very low-density polyethylene modified by use of unsaturated carboxylic acid/an intermediate layer made of nylon 6-66 copolymer resin (copolymer ratio: 80-20)/an oxygen gas barrier layer made of EVOH resin (ethylene content: 48 mol %)/the aforementioned adhesive resin layer/an inner layer which is a heat sealing layer formed by adding and mixing 10 wt % (on the basis of the resin composition) of an antifog agent master batch (RIKEMASTER LAR-360 (made by Riken Vitamin Co., Ltd.)) with an ethylene-hexene copolymer (density: 0.908 g/cm$^3$) are extruded by use of five extruders and five-type six-layer circular dies, and are welded together and co-extruded so as to achieve the above-mentioned layer configuration. The welded tubular body coming out of the dies is cooled with water, and the flat tubular body is introduced to hot tubbing to form a bubble-shaped tubular film, which is subjected to simultaneous biaxial orientation at orientation ratios in a range from 1 to 5 times respectively in a longitudinal direction (MD) and a transverse direction (TD) in accordance with an inflation method while cooling down by airing. Subsequently, the biaxially oriented film is formed into a bubble-shaped tubular body and heated with steam, and is then subjected to a heat treatment for 2 seconds while relaxing the film in an amount ranging from 1% to 6% respectively in the longitudinal direction and in the transverse direction. Then, the tubular film is folded and wound into the roll to obtain a heat-shrinkable laminated film. The thickness of the heat-shrinkable laminated film is set in a range from 3 μm to 120 μm or in a range from 10 μm to 90 μm in particular.

It is preferable to set the thickness of the polyester-based resin outer layer in a range from 0.5 μm to 10 μm or further in a range from 1 μm to 5 μm, the thickness of the polyamide intermediate layer in a range from 3 μm to 50 μm or further in a range from 5 μm to 30 μm, the thickness of the gas barrier layer further in a range from 1 μm to 30 μm or in a range from 2 μm to 15 μm, the thickness of each of the adhesive layers in a range from 0.5 μm to 5 μm, and the thickness of the sealing layer in a range from 8 μm to 80 μm or in a range from 10 μm to 60 μm in particular.

Moreover, it is also possible to perform radiation irradiation in accordance with a publicly-known method before or after orientation of the antifog laminated film of the present invention. By the radiation irradiation, an orientation characteristic, heat resistance, mechanical strength, and other factors are improved as compared to one not subjected to irradiation. The radiation irradiation has an effect to enhance film formability by orientation as well as the heat resistance by way of an appropriate cross-linking effect thereof. It is possible to use publicly-known radial rays including α rays, β rays, electron rays, γ rays, x rays, and the like. The electron rays and the γ rays are preferred from the viewpoint of the cross-linking effect. Among them, the electron rays are preferred from the viewpoint of handleability and a processing capacity when manufacturing a molded product.

A surface of the outer layer of the heat-shrinkable laminated film thus obtained is then subjected to printing. A printing operation generally is performed by a flexographic printing method, a gravure printing method, and the like. In any printing method, the printed laminated film is handled by a winding method in many cases. The printed laminated film may be directly wound, or it is possible to perform overprinting further on a printed surface in order to protect the printed surface and the antifogging property.

The case of performing the winding method while leaving the printed surface intact will be described in the first place. The chlorinated polyolefin-based resin serving as the principal resin comprising the solid content of the printed portion is obtained for instance by chlorinating crystalline polypropylene in accordance with a publicly-known method. For example, it is achieved by dispersing or dissolving raw material isotacetic polypropylene in a medium such as water, carbon tetrachloride or chloroform, and then by blowing chlorine gas in a temperature range from 50° C. to 120° C. under pressure or at normal pressure with presence of catalyst or under irradiation of ultraviolet rays. The crystalline polypropylene used therein has a weight average molecular weight in a range from 10,000 to 300,000. The degree of chlorination of the chlorinated polypropylene-based resin is set preferably in a range from 5 wt % to 50 wt % or more preferably in a range from 15 wt % to 40 wt %. Moreover, modified polypropylene introducing a hydroxyl group or a carboxyl group is also included. It is preferable to blend other resin so that the chlorinated polypropylene-based resin as the principal resin comprising the solid content of the printed portion is set equal to or above 50 wt % of resin components in the solid content of the printed portion.

Meanwhile, the urethane-based resin serving as the principal resin comprising the solid content of the printed portion does not have particular limitations, and it is possible to use various types of publicly-known polyurethane resin directly. The number average molecular weight of the obtained polyurethane resin is appropriately determined in consideration of a drying property of obtained printing ink, an anti-blocking property, film strength, oil resistance, viscosity, and the like. Here, it is usually preferable to set the number average molecular weight in a range from 5000 to 100000. As described previously, the problem of degradation in the antifogging effect of the laminated film wound into the roll is confirmed in the case of the laminated film subjected to the antifogging treatment, which is attributable to the direct and strong contact between the printed surface on the surface of the outer layer and the surface of the inner layer subjected to the antifogging treatment. In the present invention, the problem is solved by use of the printing ink containing the specific resin. Specifically, it is only necessary to coat the laminated film which is printed such that the principal resin comprising the solid content of the printed portion in the state of printing on the film is either the chlorinated polyethylene-based resin or the urethane-based resin. Preferably, it is possible to mix another resin so that the urethane-based resin is set not less than 50 wt % of the resin components in the solid content of the printed portion.

A printing ink composition usually includes a coloring material (pigment, dye), a vehicle (drying oil, semidrying oil, oil and fat such as processing oil, natural resin, a natural product derivative, resin such as synthetic resin), auxiliary agents (compounds, driers, dispersants, antifoam agents, plasticizers, antistatic agents), and other components. Although the total solid content concentration of a solution varies depending on the intended purpose thereof, the concentration is set usually in a range from about 5 wt % to 70 wt % and the rest is the solvent. Assuming that the total solid content in the solution is equal to 100 parts by weight, the resin for the printing ink is set preferably in a range from 5 to 95 parts by weight, more preferably in a range from 10 to 85 parts by weight, particularly preferably in a range from 15 to 75 parts by weight, or most preferably in a range from 15 to 65 parts by weight. The solid content other than the resin for the printing ink, such as an aggregate of the pigment, the compound, and the like are set preferably in a range from 95 to 5 parts by weight, more preferably in a range from 90 to 15 parts by weight, particularly preferably in a range from 85 to 30 parts by weight, or most preferably in a range from 85 to 35 parts by weight.

Concerning the printing ink composition, it is possible to combine a variety of publicly-known pigment dispersants and binder resin as appropriate provided that these substances do not inhibit the effect of the present invention. For example, when using a publicly-known pigment dispersant, the pigment is dispersed in the publicly-known pigment dispersant and is then added to the printing ink.

In a case where the principal resin in the solid content of the printed portion is either the chlorinated polypropylene or the urethane-based resin, various types of publicly-known binder resin usable therein for instance include cellulose-based resin such as nitrocellulose, butyl cellulose acetate, cellulose acetate propionate or the like, chlorinated polyolefin such as chlorinated polyethylene, a chlorinated ethylene/propylene copolymer or the like, chlorosulfonated polyolefin an ethylene/vinyl acetate copolymer or a chloride, a chlorosulfonate thereof, or resin such as maleic acid resin, a vinyl chloride/vinyl acetate copolymer, acryl-based resin or the like. Moreover, it is also possible to blend a surfactant, wax, and other additives as appropriate to improve ink flowability and surface coating.

The printing ink used in the present invention is not particularly limited. However, gravure ink or flexo ink is mainly applicable. Moreover, both of aqueous ink using a resin component that is soluble or dispersible in water-alcohol, and oil-based ink using a binder component that is soluble to an organic solvent are used therein. In the present invention, water-soluble or water-dispersible urethane-based resin, acid-modified or hydroxyl-modified chlorinated polypropylene-based resin or oil-based chlorinated polypropylene-based resin is used as an essential component of the resin component of the ink vehicle. As to the water-soluble urethane-based ink, (JW224 Aquaecol, indigo, made by Toyo Ink Mfg. Co., Ltd.), (Aqua Fronte JW180AQ indigo, made by Toyo Ink Mfg. Co., Ltd.), and (NEW LP Super indigo, made by Toyo Ink Mfg. Co., Ltd.) can be cited, for example. Meanwhile, as to the oil-based chlorinated polypropylene-based ink (Lamic NA730 indigo, made by Dainichiseika Color & Chemical Mfg. Co., Ltd.) can be cited, for example.

A printing operation can be executed in accordance with a conventional method. In the present invention, it is essential that the principal resin comprising the solid content of the printed portion of the film subjected to printing on the surface of the outer layer is either the chlorinated polypropylene-based resin or the urethane-based resin. To maintain the antifogging property of the obtained laminated film, it is favorable to adjust the proportion of the chlorinated polypropylene-based resin or the urethane-based resin equal to or above 50 wt %, preferably equal to or above 60 wt %, or particularly preferably equal to or above 70 wt % relative to the resin components in the solid content of the printed portion. Moreover, it is favorable to add the antifog agent into the printing ink or to coat the antifog agent onto the printed surface as appropriate. The laminated film satisfying the above-described favorable conditions provides the antifog laminated film which hardly degrades the antifogging property on the surface of the inner layer even when winding the film into a roll and saving the continuously produced film. The antifog laminated film of the present invention is favorably used for applications such as lid members of trays, pillow packages or the like.

EXAMPLES

The present invention is concretely described below with reference to examples.

Evaluation was made in accordance with the following method.

Antifogging property test: as to a laminated film having an outer layer subjected to printing on a surface and an inner layer subjected to an antifogging treatment, the surface of the inner layer subjected to the antifogging treatment and a printed surface of the outer layer subjected to printing on the surface are directly superposed and placed on a flat plane. The laminated film is let stand for 60 minutes while coating a pressure equal to 100 kgf/cm$^2$ (98.07 kPa) and at a temperature of 25° C., and then the two layers are peeled off. A mouth of a beaker of 200 cc capacity, containing 20 cc of water at a temperature of 20° C. is covered with the surface of the inner layer subjected to the antifogging treatment, which had been in contact with the printed surface of the outer layer, and the beaker is hermetically sealed with a rubber band and is put into a temperature-controlled room at a temperature of 5° C. and let stand for 60 minutes. Then, a state of water droplets attached on the surface of the inner layer covering the beaker was observed and evaluated as follows.

A condition that the bottom of the beaker is visible through the film covering the mouth of the beaker was defined as a good condition, while a condition that the bottom of the beaker was invisible due to a fog on the film when observing the bottom of the beaker through the film covering the mouth of the beaker was defined as a bad condition.

Manufacturing a heat-shrinkable laminated film (A): An outer layer (2 μm) made of polyester-based resin (an amount of isophthalic acid in acid components in ethylene terephthalate copolyester: 12 mol %, an amount of terephthalic acid therein: 88 mol %, BELLPET IFG-8L, made by Kanebo Synthetic Fibers Company)/an adhesive resin layer (1.5 μm) made of very low-density polyethylene modified by use of unsaturated carboxylic acid (ADOMER SF730, made by Mitsui Chemicals, Inc.)/an intermediate layer (7 μm) made of nylon 6-66 copolymer resin (NOVAMID 2430A1, made by Mitsubishi Engineering Plastic Corporation, (copolymer ratio: 80-20))/an oxygen gas barrier layer (5 μm) made of a saponified ethylene-vinyl acetate copolymer (EVOH resin) (EVAL EPG156B, made by Kuraray Co., Ltd., ethylene content: 48 mol %)/the aforementioned adhesive resin layer (1.5 μm)/an inner layer (24 μm) which is a heat sealing layer formed by adding and mixing 10 wt % of a master batch (RIKEMASTER LAR-360, glycerin aliphatic acid ester-based, (made by Riken Vitamin Co., Ltd.)) containing 15 wt % of an antifog agent with an ethylene-hexene copolymer (Sumikathene CS3009, made by Sumitomo Chemical Co., Ltd., VLDPE, density: 0.908 g/cm$^3$), (which were used in Examples 1 to 3 and 6, and in Comparative Examples 1 and 2), were extruded by use of five extruders and five-type six-layer circular dies, and were welded together and co-extruded so as to achieve the above-mentioned layer configuration. The welded tubular body coming out of the dies was cooled down to a temperature in a range from 10° C. to 18° C. with water. Then, the flat tubular body was introduced to hot tubbing to form a bubble-shaped tubular film, which was subjected to simultaneous biaxial orientation at orientation magnifications of 3.1 times in a longitudinal direction (MD) and 3.2 times in a transverse direction (TD) in accordance with an inflation method while cooling down by airing at a temperature in a range from 15° C. to 20° C. Subsequently, the biaxially oriented film was formed into a bubble-shaped tubular body and heated with steam, and was then subjected to a heat treatment for 2 seconds while relaxing the film in an amount of 5% in the longitudinal direction and in an amount of 5% in the transverse direction to obtain a heat-shrinkable laminated film (A). This heat-shrinkable laminated film was defined as a film (A-1). The thicknesses of the respective layers are set to (2 µm)/(1.5 µm)/(7 µm)/(5 µm)/(1.5 µm)/(24 µm) in the order from the outer layer to the inner layer.

A film used in Examples 4, 5, and 7 was provided with the same layer configuration as in Example 1 except that a cationic surfactant (SP-V Antistatic Agent (K), made by Dainichiseika Color & Chemical Mfg. Co., Ltd.) was coated (a coating amount of 0.2 g/m$^2$) on the surface of the inner layer without addition of the antifog agent master batch to the heat sealing layer. This heat-shrinkable laminated film was defined as a film (A-2).

A film used in Example 10 and in Comparative Example 3 was formed by further coating (a coating amount of 0.2 g/m$^2$) the cationic surfactant (SP-V Antistatic Agent (K), made by Dainichiseika Color & Chemical Mfg. Co., Ltd.) serving as an antifog agent on a surface of an inner layer (to which an antifog agent-containing master batch was added) of a heat-shrinkable laminated film obtained in a similar manner to Example 1. This heat-shrinkable laminated film was defined as a film (A-3).

The polyester-based resin (BELLPET IFG8L, Kanebo, Ltd), the adhesive resin made of the acid-modified VLDPE (ADOMER SF730, Mitsui Chemicals, Inc.), and an inner layer of a heat sealing layer formed by adding and mixing 10 wt % (on the basis of the master batch) of the master batch (RIKEMASTER LAR-360, glycerin aliphatic acid ester-based, (made by Riken Vitamin Co., Ltd.)) containing 15 wt % of the antifog agent with VLDPE (Sumikathene CS3009, made by Sumitomo Chemical Co., Ltd., density: 0.908 g/cm$^3$) were co-extruded by use of three extruders and were welded together by use of T-dies to obtain an unoriented film. This unoriented laminated film was defined as a film (B) In this multilayer film the thicknesses of the respective layers were set to the polyester-based resin (5 µm)/the adhesive layer (2 µm)/the VLDPE (33 µm).

Example 1

The surface of the outer layer of the film (A-1) obtained as described above was subjected to gravure printing with urethane resin-based (which essentially contains urethane resin) aqueous printing ink (NEW LP Super indigo, made by Toyo Ink Mfg. Co., Ltd.). After drying, the antifog laminated film having the printed outer layer was obtained by winding the film in an amount of 100 m on a core of a paper tube having a diameter of 3 inches. The antifogging test of this film was performed.

Example 2

The surface of the outer layer of the film (A-1) obtained as described above was subjected to gravure printing with urethane resin-based aqueous printing ink (JW224 Aquaecol, indigo, made by Toyo Ink Mfg. Co., Ltd., AQ602G solvent (IPA, water-based)). The antifog laminated film having the printed outer layer was obtained by winding the film in a similar manner to Example 1. The antifogging test of this film was performed.

Example 3

The surface of the outer layer of the film (A-1) obtained as described above was subjected to gravure printing with chlorinated polypropylene resin-based printing ink (Lamic NA730 indigo, made by Dainichiseika Color & Chemical Mfg. Co., Ltd.). The antifog laminated film having the printed outer layer was obtained by winding the film in a similar manner to Example 1. The antifogging test of this film was performed.

Example 4

The surface of the outer layer of the film (A-2) obtained as described above was subjected to gravure printing with the urethane resin-based aqueous printing ink (NEW LP Super indigo, made by Toyo Ink Mfg. Co., Ltd.). The antifog laminated film having the printed outer layer was obtained by winding the film in a similar manner to Example 1. The antifogging test of this film was performed.

Example 5

The surface of the outer layer of the film (A-2) obtained as described above was subjected to gravure printing with urethane resin-based aqueous printing ink (JW180AQ Aqua Fronte, indigo, made by Toyo Ink Mfg. Co., Ltd.). The antifog laminated film having the printed outer layer was obtained by winding the film in a similar manner to Example 1. The antifogging test of this film was performed.

Example 6

The surface of the outer layer of the film (A-1) obtained as described above was subjected to flexographic printing with the urethane resin-based aqueous printing ink (Aqua Fronte JW180AQ, indigo, made by Toyo Ink Mfg. Co., Ltd.). The anti fog laminated film having the printed outer layer was obtained by winding the film in a similar manner to Example 1. The antifogging test of this film was performed.

Example 7

The surface of the outer layer of the film (A-2) obtained as described above was subjected to flexographic printing with the urethane resin-based aqueous printing ink (Aqua Fronte JW180AQ, indigo, made by Toyo Ink Mfg. Co., Ltd.). The antifog laminated film having the printed outer layer was obtained by winding the film in a similar manner to Example 1. The antifogging test of this film was performed.

Example 8

The surface of the outer layer of the film (B) obtained as described above was subjected to gravure printing with the urethane resin-based aqueous printing ink (NEW LP Super indigo, made by Toyo Ink Mfg. Co., Ltd.). The antifog laminated film having the printed outer layer was obtained by winding the film in a similar manner to Example 1. The antifogging test of this film was performed.

Example 9

The surface of the outer layer of the film (B) obtained as described above was subjected to gravure printing with the urethane resin-based aqueous printing ink (JW224 Aquaecol, indigo, made by Toyo Ink Mfg. Co., Ltd.). The antifog laminated film having the printed outer layer was obtained by winding the film in a similar manner to Example 1. The antifogging test of this film was performed.

Example 10

The surface of the outer layer of the film (A-3) obtained as described above was subjected to gravure printing with the urethane resin-based aqueous printing ink (NEW LP Super indigo, made by Toyo Ink Mfg. Co., Ltd.). The antifog laminated film having the printed outer layer was obtained by winding the film in a similar manner to Example 1. The antifogging test of this film was performed.

Comparative Example 1

The surface of the outer layer of the film (A-1) obtained as described above was subjected to gravure printing with nitrocellulose-based aqueous printing ink (MTGN indigo, made by Toyo Ink Mfg. Co., Ltd.). The antifog laminated film having the printed outer layer was obtained by winding the film in a similar manner to Example 1. The antifogging test of this film was performed.

Comparative Example 2

The surface of the outer layer of the film (A-1) obtained as described above was subjected to flexographic printing with the nitrocellulose-based aqueous printing ink (MTGN indigo, made by Toyo Ink Mfg. Co., Ltd.). The antifog laminated film having the printed outer layer was obtained by winding the film in a similar manner to Example 1. The antifogging test of this film was performed.

Comparative Example 3

The surface of the outer layer of the film (A-3) obtained as described above was subjected to flexographic printing with the nitrocellulose-based aqueous printing ink (MTGN indigo, made by Toyo Ink Mfg. Co., Ltd.). The antifog laminated film having the printed outer layer was obtained by winding the film in a similar manner to Example 1. The antifogging test of this film was performed.

An outer layer (2 μm) made of the polyester-based resin (the amount of isophthalic acid in acid components in ethylene terephthalate copolyester: 12 mol %, the amount of terephthalic acid therein: 88 mol %, BELLPET IFG-8L, made by Kanebo Synthetic Fibers Company)/an adhesive resin layer (1 μm) made of the very low-density polyethylene modified by use of unsaturated carboxylic acid (ADOMER SF730, made by Mitsui Chemicals, Inc.)/an intermediate layer (9 μm) made of nylon 6-66 copolymer resin (UBE nylon, made by Ube Industries, Ltd., (copolymer ratio: 80-20))/an oxygen gas barrier layer (5 μm) made of the saponified ethylene-vinyl acetate copolymer (EVOH resin) (EVAL EPG156B, made by Kuraray Co., Ltd., ethylene content: 47 mol %)/the aforementioned adhesive resin layer (1 μm)/an inner layer (11 μm) which is a heat sealing layer formed by adding and mixing 10 wt % of a master batch (LAR-360, made by Riken Vitamin Co., Ltd., addition of a mixture of diglycerin laurate and glycerin olate using LLDPE as a base at a concentration of 15%) containing 15% of an antifog agent with linear low-density polyethylene LLDPE (MORETEC 0238CN, made by Idemitsu Petrochemicals Co., Ltd., density: 0.916 g/cm$^3$) in an amount of 10 wt % of the resin of the inner layer, were extruded by use of similar machines and under similar conditions to the film (A-1), and were subjected to simultaneous biaxial orientation at orientation magnifications of 3.1 times in a longitudinal direction (MD) and 3.2 times in a transverse direction (TD) in accordance with an inflation method. Subsequently, the biaxially oriented film was formed into a bubble-shaped tubular body and heated with steam, and was then subjected to a heat treatment for 2 seconds while relaxing the film in an amount of 5% in the longitudinal direction and in an amount of 5% in the transverse direction to obtain a heat-shrinkable laminated film (A-4).

Example 11

White printing ink (Flexo Lamiall II Anti-Fog White D, made by INX International Ink Co.: printing ink prepared by adding white pigment and mixed resin of polyurethane-based resin essentially containing polyurethane-based resin/nitrocellulose to a mixed solvent of n-propyl alcohol/propyl acetate=80/20 (weight ratio) and adding 3% of diglycerin aliphatic acid ester essentially containing diglycerin laurate (RIKEMARL-71-D, made by Riken Vitamin Co., Ltd., HLB=7.3) relative to a solid content) was used for flexographic printing on the outer layer of (A-4). Subsequently, overprint varnish (Versa Anti-Fog OPV D, made by INX International Ink. Co. (which was prepared by adding an antifog agent (prepared by adding 3 wt % of RIKEMAR L-71-D, made by Riken Vitamin Co., Ltd. relative to a solid content) essentially containing diglycerin laurate to a solution of mixed resin of nitrocellulose/urethane-based resin essentially containing the nitrocellulose dissolved in a mixed solvent of n-propyl alcohol/propyl acetate=80/20 (weight ratio))) in an amount of 1.0 g/m$^2$ (the solid content equivalent) was coated on a white printed surface so as to cover the printed surface and then dried. In this way, a laminated film including the white printed layer containing the antifog agent that was located on the outer layer of the laminated film and the resin essentially containing the nitrocellulose including the antifog agent, which was overprinted thereon, was obtained.

Example 12

A laminated film including blue printing ink containing the antifog agent which is flexographically printed on the outer layer of the laminated film, and the resin essentially containing the resin including the antifog agent overprinted thereon was obtained in a manner similar to Example 11 except that the white printing ink is replaced with blue printing ink (Flexo Lamiall II Anti-Fog Blue D, made by INX International Ink Co.: printing ink prepared by adding blue pigment and mixed resin of polyurethane-based resin essentially containing polyurethane-based resin/nitrocellulose to a mixed solvent of n-propyl alcohol/propyl acetate=80/20 (weight ratio) and adding 3% of diglycerin aliphatic acid ester essentially containing diglycerin laurate (RIKEMARL-71-D, made by Riken Vitamin Co., Ltd., HLB=7.3) relative to a solid content, and moreover, that the overprint varnish is replaced with (Versa Anti-Fog OPV, made by INX International Ink Co.). Here, the overprint varnish (Versa Anti-Fog OPV, made by INX International Ink Co.) was the overprint varnish prepared by adding 10 wt % of a sucrose aliphatic acid ester aqueous solution (concentration in a range from 40% to 45%) (RIKEMAR A, made by Riken Vitamin Co., Ltd., HLB of sucrose aliphatic acid ester=16.5) relative to a solid content to a solution of mixed resin of nitrocellulose/urethane-based resin essentially containing the nitrocellulose dissolved in a mixed solvent of n-propyl alcohol/propyl acetate=80/20 (weight ratio).

Example 13

A laminated film was obtained in a similar manner to Example 11 except that the white printing ink in Example 11 was replaced with white printing ink not containing the antifog agent (Flexo Lamiall II White, made by INX International Ink Co.) and that the overprint varnish was replaced with overprint varnish not containing the antifog agent (Versa, made by INX International Ink Co.).

Example 14

A laminated film was obtained in a manner similar to Example 11 except that the overprint varnish in Example 11 was not coated herein.

Example 15

A laminated film is obtained in a similar manner to Example 13 except that the overprint varnish in Example 13 was replaced with the overprint varnish (Versa Anti-Fog OPV, made by INX International Ink Co.).

Example 16

A laminated film is obtained in a similar manner to Example 13 except that the white printing ink in Example 13 was replaced with blue printing ink not containing the antifog agent (Flexo Lamiall II Blue, made by INX International Ink Co.), that the overprint varnish was replaced with the overprint varnish not containing the antifog agent (Versa, made by INX International Ink Co.), and moreover, that the cationic surfactant (SP-V Antistatic Agent (K), made by Dainichiseika Color & Chemical Mfg. Co., Ltd. (a coating amount of 0.2 $g/m^2$).

TABLE 1

|  | Laminated film | Printing ink | Printing method | Antifog agent Inner layer | Antifog agent Printed portion | Antifog agent OP portion | Antifogging property |
|---|---|---|---|---|---|---|---|
| Example 1 | A-1 | a | G | A | — | N/— | Good |
| Example 2 | A-1 | b | G | A | — | N/— | Good |
| Example 3 | A-1 | c | G | A | — | N/— | Good |
| Example 4 | A-2 | a | G | B | — | N/— | Good |
| Example 5 | A-2 | d | G | B | — | N/— | Good |
| Example 6 | A-1 | d | F | A | — | N/— | Good |
| Example 7 | A-2 | d | F | B | — | N/— | Good |
| Example 8 | B | a | G | A | — | N/— | Good |
| Example 9 | B | b | G | A | — | N/— | Good |
| Example 10 | A-3 | a | G | A + B | — | N/— | Good |
| Comparative Example 1 | A-1 | e | G | A | — | N/— | Bad |
| Comparative Example 2 | A-1 | e | F | A | — | N/— | Bad |
| Comparative Example 3 | A-3 | e | F | A + B | — | N/— | Bad |
| Example 11 | A-4 | f | F | A | C | Y/A | Good |
| Example 12 | A-4 | g | F | A | C | Y/B | Good |
| Example 13 | A-4 | h | F | A | — | Y/C | Good |
| Example 14 | A-4 | f | F | A | C | N/— | Good |
| Example 15 | A-4 | h | F | A | — | Y/B | Good |
| Example 16 | A-4 | i | F | A | — | Y/C + D | Good |

Film:
A-1: Antifog agent added to inner layer
A-2: Antifog agent coated on surface of inner layer
A-3: Antifog agent added to inner layer, and antifog agent also coated on surface of inner layer
B: Three-layer film
A-4: Antifog agent added to inner layer
Printing ink:
a: NEW LP Super indigo, made by Toyo Ink Mfg. Co., Ltd. (urethane-based resin)
b: JW224 Aquaecol, indigo, made by Toyo Ink Mfg. Co., Ltd. (urethane-based resin)
c: Lamic NA730 indigo, made by Dainichiseika Color & Chemical Mfg. Co., Ltd. (chlorinated PP-based resin)
d: Aqua Fronte JW180AQ indigo, made by Toyo Ink Mfg. Co., Ltd. (urethane-based resin)
e: MTGN indigo, made by Toyo Ink Mfg. Co., Ltd. (nitrocellulose-based resin)
f: Flexo Lamiall II Anti-Fog White D, made by INX International Ink Co., containing antifog agent (RIKEMAR L-71-D)
g: Flexo Lamiall II Anti-Fog Blue D, made by INX International Ink Co., containing antifog agent (RIKEMAR L-71-D)
h: Flexo Lamiall II White, made by INX International Ink Co.
i: Flexo Lamiall II Blue, made by INX International Ink Co.
Printing method:
G denotes gravure printing: coating amount 1.0 $g/m^2$
F denotes flexographic printing: coating amount 0.5 $g/m^2$
Antifog agent:
A: RIKEMASTER LAR-360, added to inner resin layer
B: Cationic surfactant, SP-V, made by Dainichiseika Color & Chemical Mfg. Co., Ltd.
C: RIKEMAR L-71-D
OP portion: overprinted portion
N/—: indicating absence of overprinted portion TABLE 1-continued

|  | | | | Antifog agent | | |
|---|---|---|---|---|---|---|
| Laminated film | Printing ink | Printing method | Inner layer | Printed portion | OP portion | Antifogging property |

A: Versa Anti-Fog OPV D, made by INX International Ink Co., containing antifog agent (RIKEMAR L-71-D)
B: Versa Anti-Fog OPV, made by INX International Ink Co., containing antifog agent (RIKEMAR A)
C: Versa, made by INX International Ink Co.
D: SP-V, made by Dainichiseika Color & Chemical Mfg. Co., Ltd.

INDUSTRIAL APPLICABILITY

By using chlorinated polypropylene-based resin or urethane-based resin as principal resin comprising a solid content of a printed portion of a laminated film including an outer layer having a printed portion on a surface and an inner layer subjected to an antifogging treatment, by causing the printed portion to contain an antifog agent, by adding the antifog agent to a printed surface or coating the antifog agent onto the printed portion. Alternatively, by overprinting on the printed portion, by adding the antifog agent to an overprinted portion or coating the antifog agent onto an overprinted surface, it is possible to obtain a laminated film which hardly degrades an antifogging property of the film even when causing the outer layer having the printed portion and the inner layer subjected to the antifogging treatment to be strongly brought into contact each other as a result of winding the laminated film into a roll or the like. In this manner, it is possible to provide an antifog laminated film which hardly causes fog attributable to water on the film facing a highly water-containing food product, in particular, when packing the food product in a tray.

The invention claimed is:

1. An antifog laminated film provided with at least two layers of an outer layer having a printed portion on a surface and an inner layer subjected to an antifogging treatment,
    wherein a solid content of the printed portion of the laminated film comprises an urethane-based resin as a principal resin,
    the urethane-based resin is set not less than 50 wt % of a resin component of the solid content of the printed portion,
    the inner layer comprises a resin and an antifog agent,
    the printed portion is overprinted by use of a mixed resin containing nitrocellulose as an essential component and another resin, to obtain an overprinted portion subjected to an antifogging treatment, said overprinted portion further comprising an antifog agent or said overprinted portion having an antifog agent coating, and
    the antifog agent is a surfactant selected from the group consisting of anionic surfactants, cationic surfactants, nonionic surfactants, and amphoteric surfactants or a mixture of surfactants selected from the group consisting of anionic surfactants, cationic surfactants, nonionic surfactants, and amphoteric surfactants.

2. The antifog laminated film according to claim 1, wherein the antifog agent is coated onto the printed surface of the outer layer.

3. The antifog laminated film according to claim 1, wherein the printed portion of the outer layer contains the antifog agent.

4. The antifog laminated film according to claim 1, wherein a printing ink for printing the printed portion comprises a pigment or a dye, a vehicle, and auxiliary agents.

5. The antifog laminated film according to claim 1, wherein the outer layer is made of polyester-based resin and the inner layer is made of polyolefin-based resin.

6. The antifog laminated film according to claim 5, further comprising an oxygen gas barrier layer.

7. The antifog laminated film according to claim 1, wherein the inner layer is a heat sealing layer.

8. The antifog laminated film according to claim 1, wherein the antifog laminated film has a heat-shrinkable property.

9. The antifog laminated film according to claim 1, wherein the resin component of the solid content of the printed portion further comprises nitrocellulose.

10. The antifog laminated film according to claim 1,
    wherein said another resin is a urethane-based resin, and the resin component of the solid content of the printed portion further comprises nitrocellulose.

11. The antifog laminated film according to claim 1, wherein the content of the antifog agent in the inner layer is set in a range from 0.2 wt % to 5 wt % of a resin composition in the inner layer.

12. The antifog laminated film according to claim 1, wherein the content of the antifog agent in the overprinted portion is set in a range from 0.5 wt % to 15 wt % of a solid content in the overprinted portion and the coating amount of the antifog agent on the overprinted portion is set in a range from 0.01 g/m$^2$ to 1.0 g/m$^2$.

13. An antifog laminated film provided with at least two layers of an outer layer having a printed portion on a surface and an inner layer subjected to an antifogging treatment,
    wherein a solid content of the printed portion of the laminated film comprises an urethane-based resin as a principal resin,
    the urethane-based resin is set not less than 50 wt % of a resin component of the solid content of the printed portion,
    the inner layer has an antifog agent coating,
    the printed portion is overprinted by use of a mixed resin containing nitrocellulose as an essential component and another resin, to obtain an overprinted portion subjected to an antifogging treatment, said overprinted portion further comprising an antifog agent or said overprinted portion having an antifog agent coating, and
    the antifog agent is a surfactant selected from the group consisting of anionic surfactants, cationic surfactants, nonionic surfactants, and amphoteric surfactants or a mixture of surfactants selected from the group consisting of anionic surfactants, cationic surfactants, nonionic surfactants, and amphoteric surfactants.

14. The antifog laminated film according to claim 13, wherein the resin component of the solid content of the printed portion further comprises nitrocellulose.

15. The antifog laminated film according to claim 13, wherein said another resin is a urethane-based resin, and the resin component of the solid content of the printed portion further comprises nitrocellulose.

16. The antifog laminated film according to claim 13, wherein the coating amount of the antifog agent on the inner layer is set in a range from 0.01 g/m² to 1.0 g/m².

17. The antilaminated film according to claim 13, wherein the content of the antifog agent in the overprinted portion is set in a range from 0.5 wt % to 15 wt % of a solid content in the overprinted portion and the coating amount of the antifog agent on the overprinted portion is set in a range from 0.01 g/m² to 1.0 g/m².

* * * * *